Figure 1:
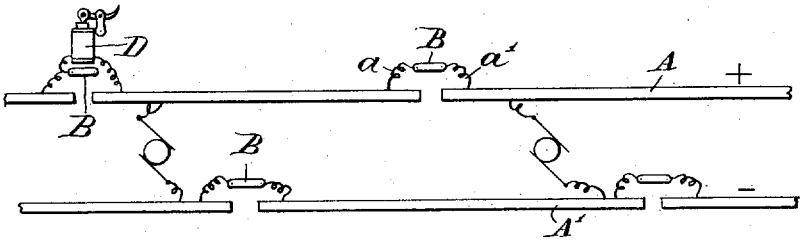

W. H. KNIGHT.

ELECTRIC RAILWAY.

No. 11,083. Reissued June 10, 1890.

Witnesses:
W. M. Twombly.
[illegible]

Inventor:
Walter H. Knight
by Bakley & Knight
Attys

THE NORRIS PETERS CO., PHOTO-LITHO., WASHINGTON, D. C.

UNITED STATES PATENT OFFICE.

WALTER H. KNIGHT, OF NEWTON, MASSACHUSETTS.

ELECTRIC RAILWAY.

SPECIFICATION forming part of Reissued Letters Patent No. 11,083, dated June 10, 1890.

Original No. 424,888, dated April 1, 1890. Application for reissue filed May 14, 1890. Serial No. 351,819.

*To all whom it may concern:*

Be it known that I, WALTER H. KNIGHT, a citizen of the United States, residing at Newton, in the county of Middlesex and State of Massachusetts, have invented certain new and useful Improvements in Electric Railways, of which the following is a specification.

This application is a division of my application filed March 13, 1886, No. 195,133.

In electric railways the supply-conductor is necessarily bared or exposed, so that there is greater danger of faults occurring along the line than in other systems in which the conductor can be normally insulated, and this danger is especially great in the conduit system, wherein the conductors are underground and not readily accessible for inspection.

The object of my present invention is to provide means for detecting and locating a ground, short circuit, or other fault interfering with the normal working of the railway, as well as for cutting out a faulty section.

For the scope of the invention reference is made to the claims; but I will also state that, so far as I know, I am the first to provide any permanent and practicable devices for detecting and indicating the location of these faults along the line, so that I do not intend to be limited to the devices shown, and, in fact, am aware of many modifications which could be made therein.

The normal working of the well-known series system of electric railways requires the presence of a sectional conductor and bridging switches; but, inasmuch as the direct and return branches of the conductor are normally connected in series through the motor-terminals, the motor-circuit will be unaffected until the ground or fault is reached. At that point, however, the motor will be short-circuited and will stop, thereby giving the desired indication respecting the location of the fault.

In the multiple-arc system the supply-conductor is normally insulated from the return and the motors are in parallel therewith, so that if only a single conductor becomes grounded the motor gives no indication, while if the line-conductors, which are of low resistance, become short-circuited the motor will be likewise short-circuited, and will stop at whatever point upon the road it may happen to be, thereby indicating that something is the matter, but giving no clue to the nature or location of the fault. It is evident that the short circuit will include that portion of the supply-conductor between the generator and the fault and that alone. It is therefore only necessary to provide some means for inspecting the current upon successive points along the line in order to locate the fault. This is what I have done in my invention, and preferably I divide the supply-conductor into sections and provide a corresponding series of detectors permanently connected with the sections, so that the presence of a fault upon any section will be indicated by a corresponding detector.

Figure 2:
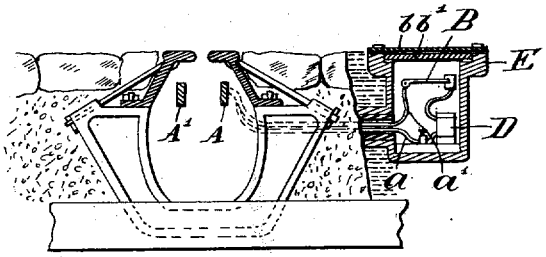

Figure 1 is a diagrammatic view showing my invention. Fig. 2 is a cross-sectional view showing the conductors in a conduit and the housing for the detecting device, and Fig. 3 is a detail view showing a magnet-indicator upon a larger scale.

In these views, A represents a supply-conductor, which is connected to one pole of the source of electrical supply, and is situated at such a point as to be readily accessible to the contact device only. A′ represents a similar return-conductor, which is connected to the other pole of the generator and is electrically disconnected from A, except through the contact devices in circuit with the motors traveling over the railway. Any other return, however, would answer equally well. These conductors are preferably formed of a number of independent insulated sections of rigid material, and from the adjacent ends of the successive sections there lead conductors *a a′* to an accessible point where there are located switches B B, which serve as detecting or testing devices, and which, together with conductors *a a′*, couple up the independent sections of each supply-conductor in a continuous circuit during the normal operation of the railway. As the supply-conductor is necessarily bared, the safety of the public demands that it be placed in a position not readily accessible, except to the contact device; but by leading off therefrom the conductors *a a′* the switches or other detecting devices may be included in the main circuit, and at the same time are brought to more accessible points, where they can be readily inspected and manipulated. Should there by accident be a short circuit, no current would be passing over the conductors, except between the generator and the short circuit, and this fact would be indicated upon turning the switches, when an arc would be formed between the end of the switch and its contact-plate, if the current is passing over it, while no arc would follow if there were no current upon that part of the circuit. Therefore, by turning the switches in succession the location of the fault can be quickly determined and as easily remedied, for by breaking the circuit at one of the switches all of the cars between the generator and the switch would operate in their usual manner.

Instead of relying upon the formation of an arc at the switch, a magnet-indicator D can be included in the circuit either permanently, as in Fig. 1, or by turning the switch, as in Fig. 2.

Figure 3:
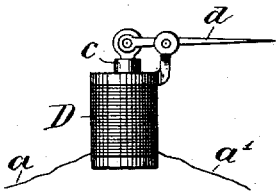

A suitable and simple form of indicator is shown in Fig. 3, wherein *c* is the core of a solenoid, and *d* is a pointer or indicator pivoted to an arm projecting from the magnet, and also at its inner end pivotally joined to the core *c*.

The sectional conductor and switches serve other important functions also. For instance, when it is desired to run cars only over a portion of the line the remaining portion can be cut out of circuit, thereby avoiding leakage or danger to passing traffic should the conductor be exposed. A single section may also be cut out for repairs, and if the remaining sections be coupled up in circuit travel will not be interfered with, for means can be readily provided to propel the car over the break.

In using the terms "detecting device," therefore, as generically descriptive of the switch, the magnet-indicator, or other detector, I mean to include a switch, when used for the above-named purposes, as well as for simply testing the circuit by observing the presence or absence of an arc at the contact.

In Fig. 2 there is shown a conduit of any desired construction inclosing the supply-conductors, and while there is especial liability of short circuits arising in this system, so also is it especially difficult to get at the supply-conductors in the conduit for inspection. I have therefore located the detectors away from the line of the conductors, and usually place them in suitable pockets or housings accessible from the surface of the ground.

E is an iron box set beside the conduit and connected to it by a tube, through which pass the conductors *a a'*, leading to switch B. The housing has an inside shield *b'*, made of transparent material—such as glass—and an outer protecting-cover *b*. If inspection of the devices in the box is necessary, the outside cover alone is removed, while if manipulation is also necessary the glass shield, too, can be taken off. It is evident that this housing may be used in different connections to protect any other devices connected to the supply-conductor to which ready access is desirable.

I claim as my invention—

1. The combination, in an electric railway, of a bared supply-conductor connected to one pole of the source of electrical supply and a return in circuit with the other pole, but electrically disconnected from the first-named conductor except through the motors traveling over the railway, with a series of permanently-located detecting devices, each operated by the current upon a different section of the supply-conductor to indicate the location of a fault thereupon.

2. The combination, in an electric railway, of a supply-conductor consisting of a number of independent sections connected to one pole of the source of electrical supply, and a return electrically disconnected from the said conductor except through the motors traveling over the railway, with a series of detectors corresponding to and normally in circuit with the said sections, respectively, whereby the presence of a fault upon any section may be indicated by a corresponding detector.

3. The combination, with a sectional supply-conductor connected to one pole of the source of electrical supply, and a return electrically disconnected therefrom except through the motors traveling over the railway, of a series of detecting devices normally establishing an electrical connection between the adjacent ends of successive sections of the supply-conductor, for the purpose set forth.

4. The combination, in an electric railway, of a bared sectional supply-conductor connected to one pole of the source of supply, and a return electrically disconnected therefrom except through the motors traveling over the railway, with a series of conductors connected to said sections, respectively, and a detecting device operated by the current in any desired one of the said conductors for locating a fault, as set forth.

5. The combination, in an electric railway, of a bared supply-conductor composed of a number of insulated sections, a return electrically disconnected therefrom except through the motors traveling over the railway, with a corresponding series of switches normally establishing an electrical connection between successive sections of the conductor, but adapted to break the circuit at any desired point or points.

6. The combination, in an electric railway, of a bared sectional supply-conductor connected to one pole of the source of electricity and accessible to the contact device only, and a return electrically disconnected from the said conductor except through the motors traveling over the railway, with a series of conductors leading from the adjacent ends of the successive sections to accessible points, and switches at said points coupling up the sections in a continuous circuit during the normal operation of the railway.

7. The combination, in an electric railway, of a supply-conductor inclosed in a slotted conduit and divided into sections, and a return electrically disconnected therefrom except through the traveling motors, with a series of switches placed at intervals normally coupling up the said sections in a continuous circuit and accessible from without the conduit.

8. The combination, in an electric railway, of a supply-conductor divided into sections and inclosed in a conduit, and a return electrically disconnected therefrom except through the traveling motors, with a series of conductors and switches forming an electrical connection between the adjacent ends of successive sections, and an inclosure for each of said switches placed outside the line of conduit.

9. The combination, in an electric railway, of a conduit, an inclosed conductor, and traveling motors in parallel therewith, with detecting devices located adjacent to and operated by the current upon different portions of said conductor, and housings for said detecting devices having transparent portions, whereby the detecting device may be seen from the street.

10. The combination of the conduit and inclosed conductor with the pocket or inclosure opening upon the street, having a glass shield and a removable protecting-cover for said shield, and devices connected to the supply-conductor housed in said inclosure.

WALTER H. KNIGHT.

Witnesses:

CHAS. L. STURTEVANT,
STEPHEN JANNUS.